United States Patent
Scrivano

(10) Patent No.: US 12,124,414 B2
(45) Date of Patent: Oct. 22, 2024

(54) DEDUPLICATION OF CONTAINER IMAGE FILES

(71) Applicant: RED HAT, INC., Raleigh, NC (US)

(72) Inventor: Giuseppe Scrivano, Spezzano della Sila (IT)

(73) Assignee: Red Hat, Inc., Raleigh, NC (US)

( * ) Notice: Subject to any disclaimer, the term of this patent is extended or adjusted under 35 U.S.C. 154(b) by 66 days.

(21) Appl. No.: 17/533,361

(22) Filed: Nov. 23, 2021

(65) Prior Publication Data

US 2023/0161736 A1  May 25, 2023

(51) Int. Cl.
*G06F 16/00* (2019.01)
*G06F 16/16* (2019.01)
*G06F 16/174* (2019.01)
*G06F 16/178* (2019.01)

(52) U.S. Cl.
CPC ........ *G06F 16/1752* (2019.01); *G06F 16/164* (2019.01); *G06F 16/178* (2019.01)

(58) Field of Classification Search
CPC ... G06F 16/1752; G06F 16/164; G06F 16/178
See application file for complete search history.

(56) References Cited

U.S. PATENT DOCUMENTS

| | | | |
|---|---|---|---|
| 9,928,210 B1 | 3/2018 | Zhang et al. | |
| 2014/0201170 A1 | 7/2014 | Vijayan et al. | |
| 2019/0251190 A1* | 8/2019 | Scrivano | G06F 16/162 |
| 2021/0141760 A1* | 5/2021 | Li | G06F 16/156 |
| 2022/0138207 A1* | 5/2022 | Yelheri | G06F 16/289 707/722 |

FOREIGN PATENT DOCUMENTS

CN  112433810 A  3/2021

OTHER PUBLICATIONS

Tokunaga, K. (2021). "Starting up Containers Super Fast With Lazy Pulling of Images," NTT, pp. 27.
Li, H. (Jul. 15-17, 2020). "DADI: Block-Level Image Service for Agile and Elastic Application Deployment," Usenix, pp. 15.
Extended European Search Report on the Patentability of Application No. 22151656, Mailed Jun. 12, 2022, 7 pages.

* cited by examiner

*Primary Examiner* — Alex Gofman
*Assistant Examiner* — Suman Rajaputra
(74) *Attorney, Agent, or Firm* — Womble Bond Dickinson (US) LLP

(57) ABSTRACT

A method includes receiving, at a container registry, a container image including a set of files, determining that at least one file of the set of files is a duplicate of a previously stored container image file at the container registry. The method further includes storing the container image at the container registry with the at least one file of the plurality of files that is a duplicate of the previously stored container image file removed from the container image.

20 Claims, 11 Drawing Sheets

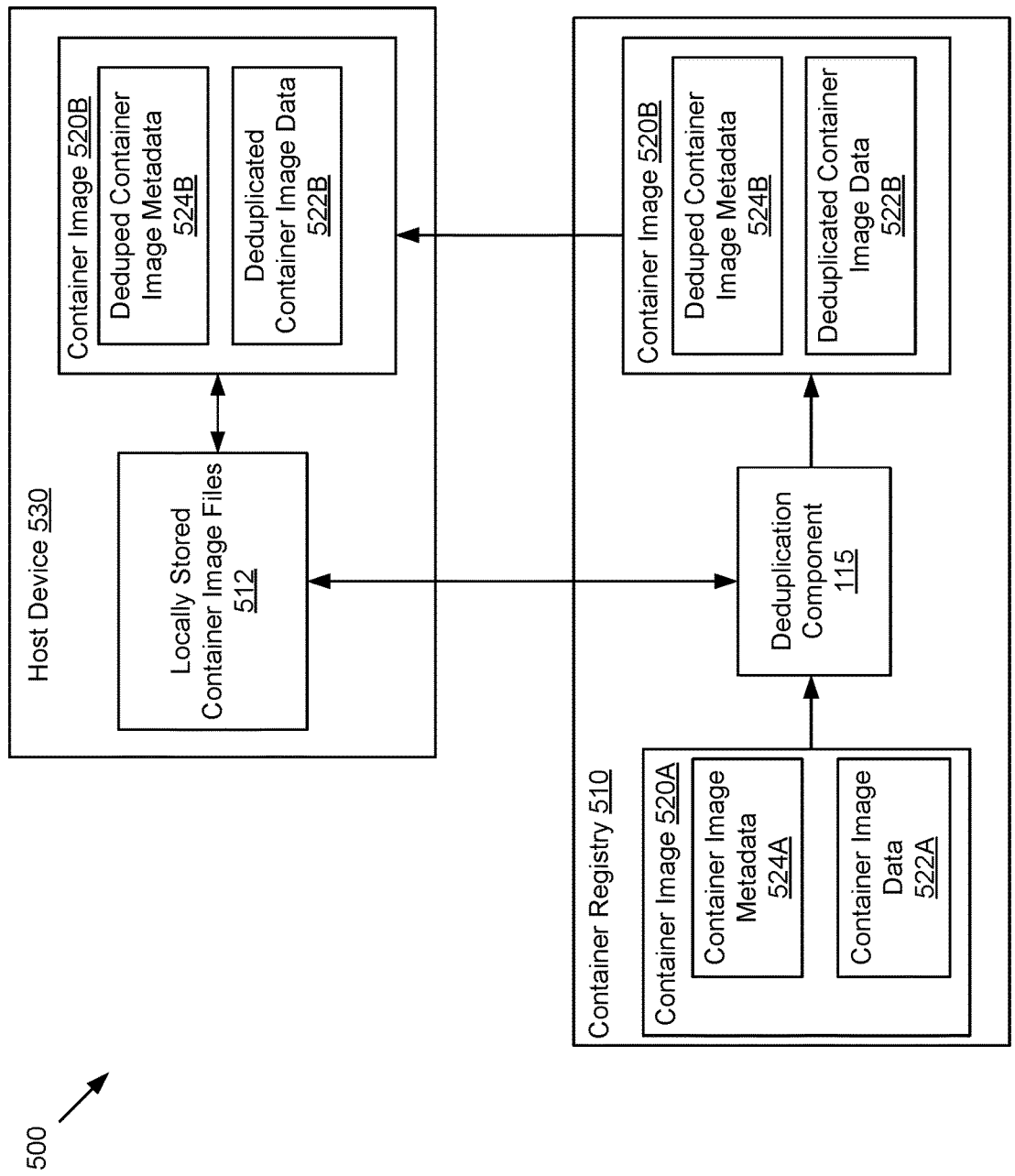

DEDUPLICATION OF CONTAINER IMAGE FILES

TECHNICAL FIELD

Aspects of the present disclosure relate to container image management, and more particularly, to deduplication of container image files in storing and retrieving container images.

BACKGROUND

A container may be an isolated execution environment in which one or more processes may be executed. A container may include isolated computing resources to act as a sandbox computing environment. A container image may include the allocated resources and necessary file systems for a container instance to be instantiated. A container registry may store several different container images that may be retrieved and instantiated at a host computing system.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 depicts an example system for retrieving a container image, in accordance with some embodiments.

DETAILED DESCRIPTION

Figure 1:
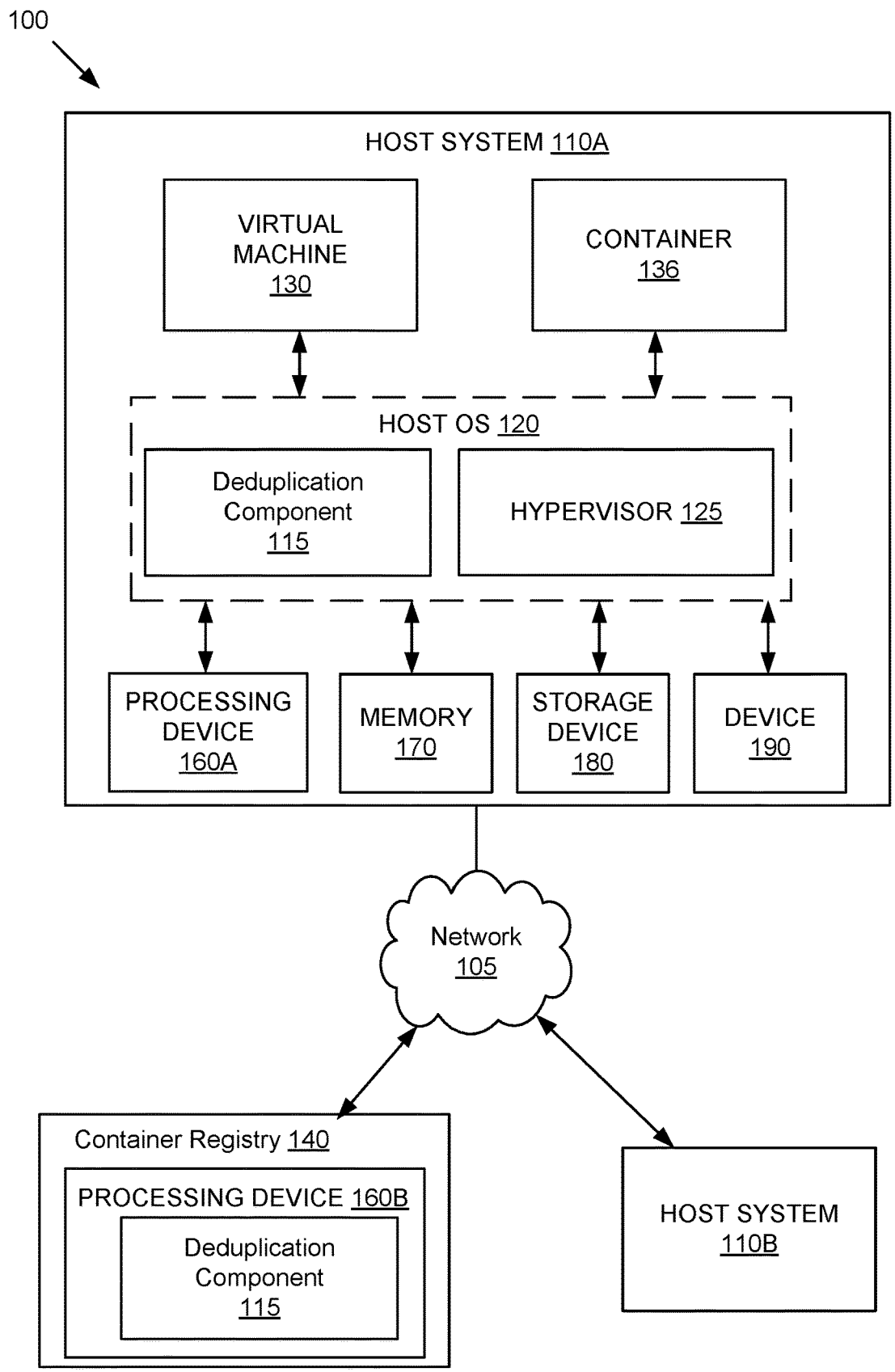
FIG. 1 is a block diagram that illustrates an example computer architecture, in accordance with some embodiments.

A container image may be a collection of files and file systems to be used for allocating computing resources and to provide an isolated execution environment for one or more applications, functions, processes, etc. In some instances, the container image may be stored in a compressed format that can be retrieved and extracted to build a container instance. Many times multiple container images include several of the same files, each of which are stored and retrieved individually for each of the container images. For example, in a container registry in which container images may be stored for later retrieval can include container images that are only slightly different from one another, yet all the files of each container image is stored to the registry. Similarly, when a container image is pushed to the registry, many redundant or duplicate files of similar container images may be transmitted to the container registry even though many of the files are already present at the container registry from previously pushed container images. Furthermore, in some instances when a host machine requests a container image from the registry, the host machine may already have some of the files for the requested container already present at the host machine but the entire container image may be pulled from the registry. The above inefficiencies of conventional systems result in longer than necessary push and pull times of container images to and from a container registry as well as large storage costs due to duplicate files stored at the registry.

Aspects of the present disclosure address the above-noted and other deficiencies by providing for deduplication of container image files pushed to and pulled from a container registry. In some examples, processing logic may deduplicate storage of container images at the container registry. In some examples, processing logic may deduplicate container image files prior to pushing the container image to the container registry. In some examples, processing logic may deduplicate container image files during a pull of a container image from the registry. To deduplicate the container image files, the processing logic may generate a compressed version of each container image that is searchable at a file granularity level. For example, each file of the container image may be compressed individually and the compressed files may then be appended together for the full container image. The processing logic may determine a checksum or other index for each of the compressed files of the container image to identify duplicate files (e.g., files with the same checksum or index).

In some examples, a deduplication component at the container registry may receive a container image and determine if any of the files of the container image have a duplicate that is already stored at the container registry. For example, for each file in the container image, the deduplication component may search the registry for a file with a checksum or other index matching the file of the container image. If the deduplication component identifies a matching file that is already stored at the registry, the deduplication component may remove the file of the container image that has the duplicate and update metadata of the container image to reference the previously stored matching file at the offset location of the removed file. Therefore, the container image can be stored without the duplicate file but can be fully rebuilt using the metadata with the reference to the previously stored file. For example, upon a pull request of the container image, the deduplication component can retrieve the previously stored file and insert it in the container image at the identified offset of the removed file.

In some examples, a deduplication component at a client device may deduplicate a container image prior to pushing the image to the container registry. For example, upon determining that a container image is to be pushed to the registry, the deduplication component may send a list of checksums or other index of each of the files in the container image to the registry. The registry may determine if any of the checksums or indexes in the list match any files already stored at the registry. The registry may then return a second list indicating which of the files were matched at the registry. The deduplication component may then remove the files from the container image and update metadata of the files to reference the previously stored files at the offsets of the removed files.

In some examples, a deduplication component at a host or the registry may deduplicate a container image during a pull request of the container image. For example, during a pull of the container image, the deduplication component may determine if any of the files of the requested container image are already present at the host. The deduplication component may then pull only the container image files from the registry that are not already present at the host.

Providing for deduplication of container images for push and pull requests reduces the network bandwidth and compute resources required for a push and pull of containers as well as reducing the latency of such operations. Additionally, deduplication of container images stored at a container registry may significantly reduce the storage overhead of container image storage at the registry.

FIG. 1 depicts a high-level component diagram of an illustrative example of a computer system architecture 100, in accordance with one or more aspects of the present disclosure. One skilled in the art will appreciate that other computer system architectures are possible, and that the implementation of a computer system utilizing examples of the invention are not necessarily limited to the specific architecture depicted by FIG. 1.

As shown in FIG. 1, computer system architecture 100 includes host systems 110A-B and container registry 140. The host systems 110A-B and container registry 140 include one or more processing devices 160A-B, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing devices 160A-B. It should be noted that although, for simplicity, host system 110A is depicted as including a single processing device 160A, storage device 180, and device 190 in FIG. 1, other embodiments of host systems 110A may include a plurality of processing devices, storage devices, and devices. Similarly, container registry 140 and host system 110B may include a plurality of processing devices, storage devices, and devices. The host systems 110A-B and container registry 140 may each be a server, a mainframe, a workstation, a personal computer (PC), a mobile phone, a palm-sized computing device, etc. In embodiments, host systems 110A-B and container registry 140 may be separate computing devices. In some embodiments, host systems 110A-B and/or container registry 140 may be implemented by a single computing device. For clarity, some components of container registry 140 and host system 110B are not shown. Furthermore, although computer system architecture 100 is illustrated as having two host systems, embodiments of the disclosure may utilize any number of host systems.

Host system 110A may additionally include one or more virtual machines (VMs) 130, containers 136, and host operating system (OS) 120. VM 130 is a software implementation of a machine that executes programs as though it were an actual physical machine. Container 136 acts as an isolated execution environment for different functions of applications. The VM 130 and/or container 136 may be an instance of a serverless application or function for executing one or more applications of a serverless framework. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110A-B and container registry 140 may be coupled (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110A-B and/or privacy preservation platform 140. In some embodiments, host system 110A and 110B may be a part of privacy preservation platform 140. For example, the virtual machines 130 and/or containers 136 of host system 110A and 110B may be a part of a virtual network of the container registry 140.

In embodiments, processing device 160B of the container registry 140 executes a deduplication component 115 for deduplicating container image files pushed to and pulled from container registry 140. In some examples, at least a portion of deduplication component 115 may also be included at host system 110A (e.g., executed by host OS 120). The deduplication component 115 may determine whether files of a container image being pushed to container registry 140 are already stored at the container registry 140. For example, the deduplication component 115 may determine whether a checksum of each of the files of the container image match any files already stored at the container registry 140. If a file matches, then the file is removed from the container image and a reference to the already stored file is inserted into the metadata of the container image. In some examples, the deduplication is performed prior to pushing the container, thus reducing the amount of data pushed to the container registry 140. In some examples, a similar deduplication is performed by the deduplication component 115 when the host system 110A requests to pull a container image from the container registry 140. For example, the deduplication component 115 determines if any of the files of the container image are already present at the host system 110A and pulls only the files of the container image that are not already present at the host system 110A. Further details regarding the deduplication component 115 will be discussed at FIGS. 2-9 below.

Figure 2:
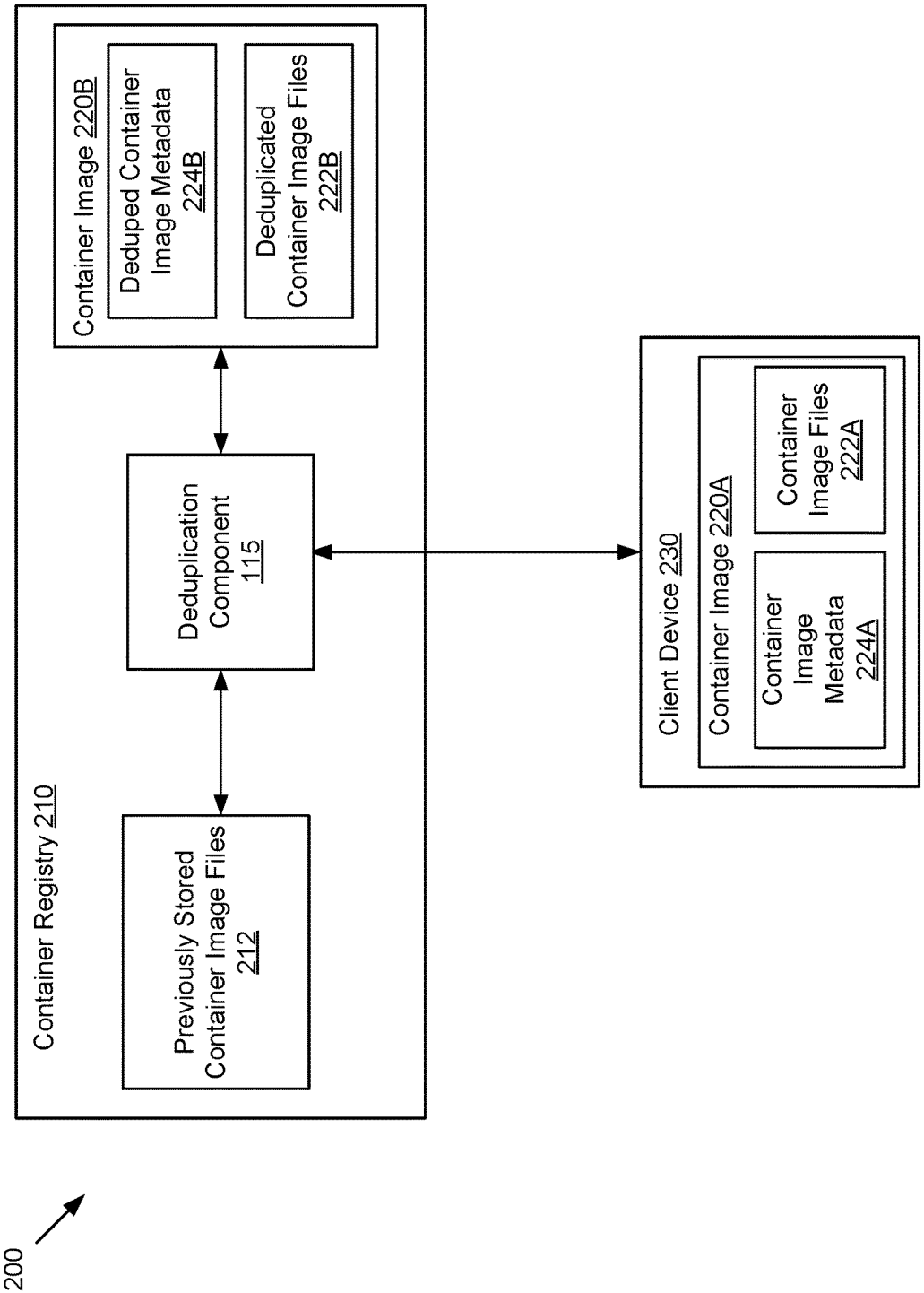
FIG. 2 is an illustration of an example of a computer system architecture for container image file deduplication, in accordance with embodiments of the disclosure.

FIG. 2 depicts an example of a system 200 for deduplication of container image files pushed to a container registry. System 200 includes a container registry 210 and a client device 230. Container registry 210 and client device 230 may each be a server, a mainframe, a workstation, a personal computer (PC), a mobile phone, a palm-sized computing device, or any other computing device. In some examples, client device 230 may push a container image 220A including container image files 222A and container image metadata 224A to the container registry 210 to be stored. The client device 230 may push the container image 220A to the container registry 210 via an application programming interface (API) of the container registry 210 or any other interface provided by the container registry 210 for uploading of container images. In some examples, a deduplication component 115 may receive the container image 220 and deduplicate files of the container image prior to storing the container image 220A to persistent storage of the container registry 210. The deduplication component 115 may compare the container image files 222A of the container image 220A to previously stored container image files 212 of the container registry 210. For example, the deduplication component 115 may determine a checksum for each file in the container image files 222A and use the checksum to search for a file in the previously stored container image files 212 with a matching checksum. If a matching file is found, then the deduplication component 115 may remove the file from the container image files 220A and update the container image metadata 224A to include a reference to the matching file in the previously stored container image files 212. For example, the deduplication component 115 may add a checksum, or other index, of the previously stored container image file as a reference to the previously stored file. The deduplication component 115 may then store the deduped container image 220B with the deduped container image files 222B without the duplicate file and the deduped container image metadata 224B with the reference to the matching file of the previously stored container image files 212.

In some examples, the deduplication component 115 may also rebuild the original container image 220A upon receiving a pull request for the container image 220A. For example, the deduplication component may retrieve the deduped container image files 222B and the deduped container image metadata 224B of the deduped container image 220B. The deduplication component 115 may then retrieve the matching file from the previously stored container image files 212 using the reference to the matching file in the deduped container image metadata 224B. The deduplication component 115 may then append the retrieved file to the offset of the container image 220B indicated by the metadata 224B to rebuild the original container image 220A. The container registry 210 may then provide the container image 220A to the client device 230 according to the pull request.

Figure 3:
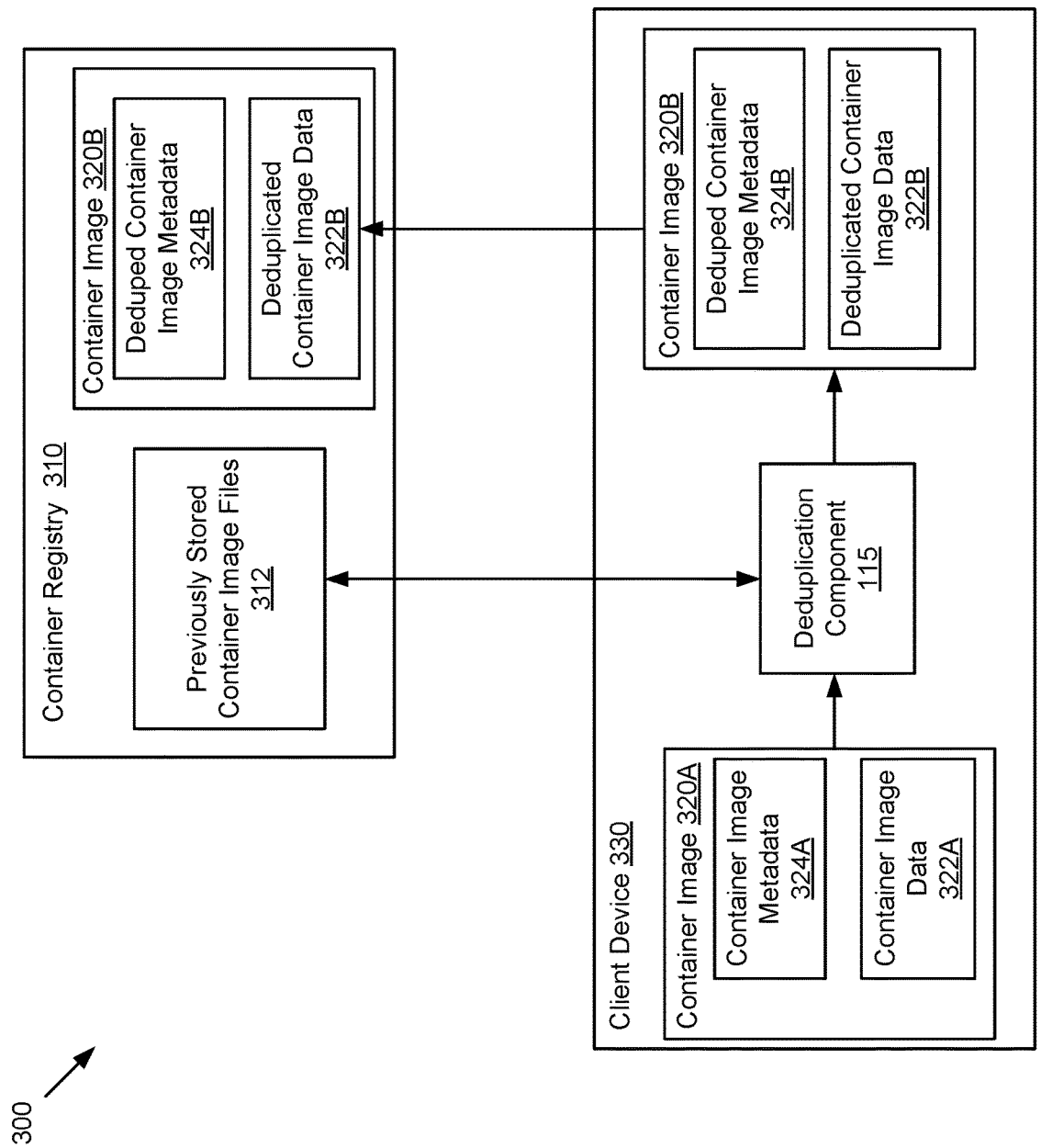
FIG. 3 depicts an example system for optimized push of container images to a container registry, in accordance with some embodiments.

FIG. 3 is an example of a system 300 for deduplicating a push of a container image, according to some embodiments. The system 300 include a client device 330 and a container registry 310. In some examples, the client device 330 may include a deduplication component 115 for deduplicating a container image 320A before pushing the container image 320A to the container registry 310. For example, the deduplication component 115 may determine that container image 320 is to be pushed to the container registry 310. The deduplication component 115 may then generate a list of files (e.g., a list of checksums or other index) of the container image files 322A and send the list to the container registry 310. The container registry 310 may compare the list to the previously stored container image files 312 of the container registry 310 to determine if any files match any of the files in the list. The container registry 310 may then return a second list to the deduplication component 115 indicating which of the container image files 322A are included in the previously stored container image files 312. The deduplication component 115 then remove the files from the container image files 322A that are already included in the previously stored container image files 312. The deduplication component 115 may further update the container image metadata 324A to include a reference to the previously stored container image files 312 at an offset in the container image 320A corresponding to the removed file. The deduplication may result in container image 320B with deduped container image files 322B with one or more files of container image files 322A removed and deduped container image metadata 324B with references to one or more previously stored container image files corresponding to the removed files. The client device 330 may then push the deduped container image 320B to the container registry 310 to be stored. Accordingly, only the files of the container image 320A that are not already stored at the container registry 310 (e.g., new or unique files) are transmitted to the container registry 310 to be stored. Similar to the description of FIG. 2, the container registry 310 (e.g., via a deduplication component at the registry) may rebuild the original container image 320A, upon receiving a pull request for the container image 320A, by retrieving the files in the previously stored container image files 312 referenced by the deduped container image metadata 324B.

Figure 4A:
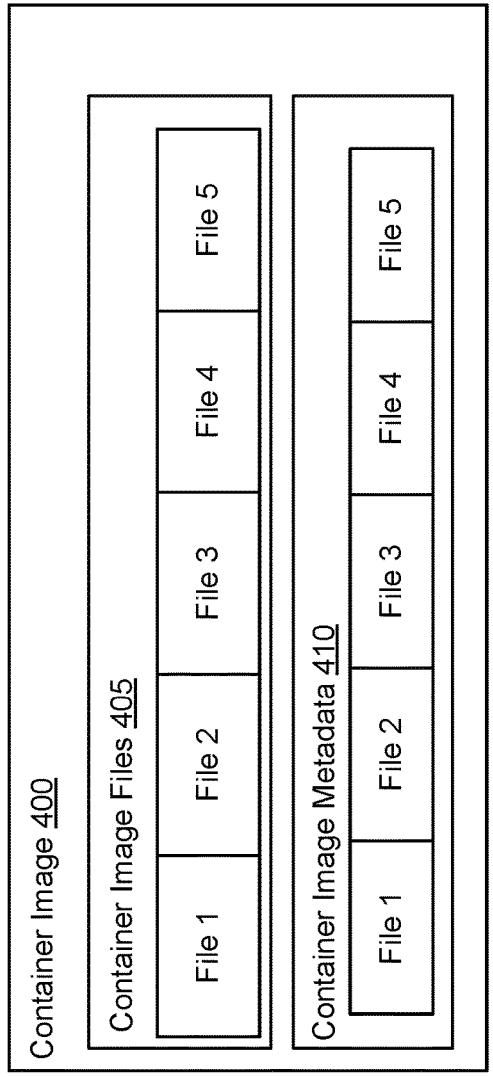
FIG. 4A depicts an example of a container image to be pushed to a container image registry, in accordance with some embodiments.

FIG. 4A depicts an example container image 400 that is to be deduplicated before being stored at a container registry, according to some embodiments. The container image 400 includes container image files 405 and container image metadata 410. In some examples, the container image files 405 may be individually compressed files appended together. The container image files 405 may include the actual data defining the resource and file systems of the container image 400. The container image metadata 410 may include information about each of the container image files 405, such as an offset of each file, identifying information, checksums, etc. As depicted in FIG. 4A, the container image files 405 may include five files and the container image metadata 410 may include offset locations of each of the five files in the container image files 405. Accordingly, each of the files may be individually searchable and retrievable.

Figure 4B:
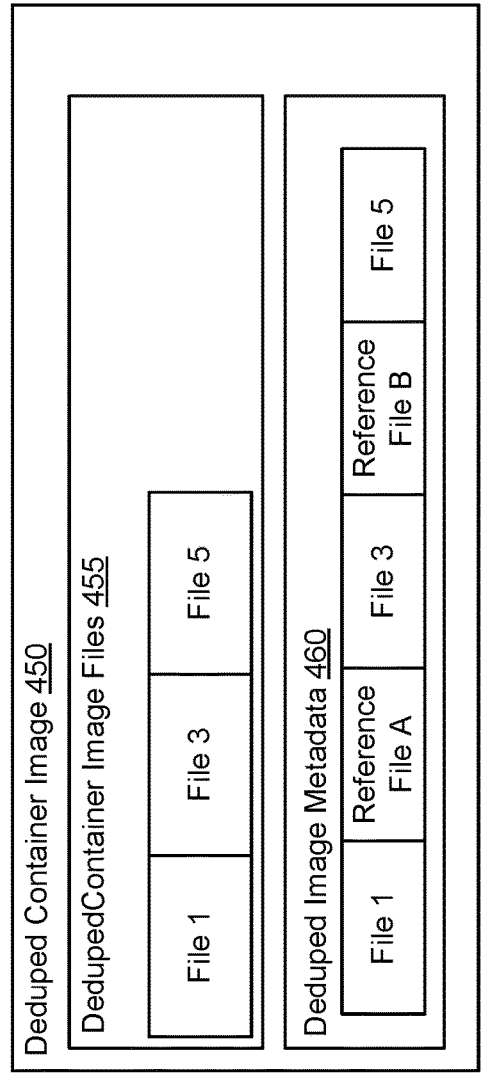
FIG. 4B depicts an example of a deduplicated container image, in accordance with some embodiments.

FIG. 4B depicts a deduplicated container image 450 of the container image 400, according to some embodiments. Similar to container image 400, deduped container image 450 includes container image files (e.g., deduped container image files 455) and container image metadata (e.g., deduped image metadata 460). However, the deduped container image files 455 may include only a subset of the original files of container image 400. In the depicted example, file 2 and file 4 have been removed from the deduped container image files 455. In some examples, a deduplication component may have identified file 2 and file 4 as already being present at a container registry and removed file 2 and file 4 from the container image. Additionally, the deduped image metadata 460 includes a reference to file A at the file 2 offset and a reference to file B at the file 4 offset. File A may be a duplicate of file 2 that is already stored at the container registry and file B may be a duplicate of file 4 that is already stored at the container registry. Therefore, deduped container image 450 may store the new files (file 1, file 3, and file 5) at the container registry without the already stored files (file 2 and file 3) and update the deduped image metadata 460 to reference already stored files (file A and file B) at the container registry. Thus, duplicate files are not stored at the container registry but the original container image 400 can be rebuilt by retrieving previously stored files referenced by deduped image metadata 460 and appending them at the offsets of the removed files.

FIG. 5 is an example of a system 500 for deduplicating a pull of a container image, according to some embodiments. The system 500 includes a host device 530 and a container registry 510. In some examples, the container registry 510 may include a deduplication component 115 for deduplicating a container image 520A before providing the container image 520A to the host device 510 in response to a pull request. The deduplication component 115 may then generate a list of files (e.g., a list of checksums or other index) of the container image files 422A and send the list to the host device 530. The host device 530 may compare the list to the locally stored container image files 512 of the host device 530 to determine if any files match any of the files in the list. The host device 530 may then return a second list to the deduplication component 115 indicating which of the container image files 522A are included in the locally stored container image files 512. The deduplication component 115 then removes the files from the container image files 522A that are already included in the previously stored container image files 512. The deduplication component 115 may further update the container image metadata 524A to include a reference to the previously stored container image files 512 at an offset in the container image 520A corresponding to the removed file. The deduplication may result in container image 520B with deduped container image files 522B with one or more files of container image files 522A removed and deduped container image metadata 524B with references to one or more previously stored container image files corresponding to the removed files. The container registry 510 may then provide the deduped container image 520B to the host device 530 to be rebuilt and instantiated. Accordingly, only the files of the container image 520A that are not already stored locally at the host device 530 (e.g., new or unique files) are transmitted to the host device 530. The host device 530 (e.g., via a deduplication component at the host device) may rebuild the original container image 520A by retrieving the files in the locally stored container image files 512 referenced by the deduped container image metadata 524B and inserting them at the offsets of the removed files (e.g., indicated by the deduped metadata 524B).

Figure 6:
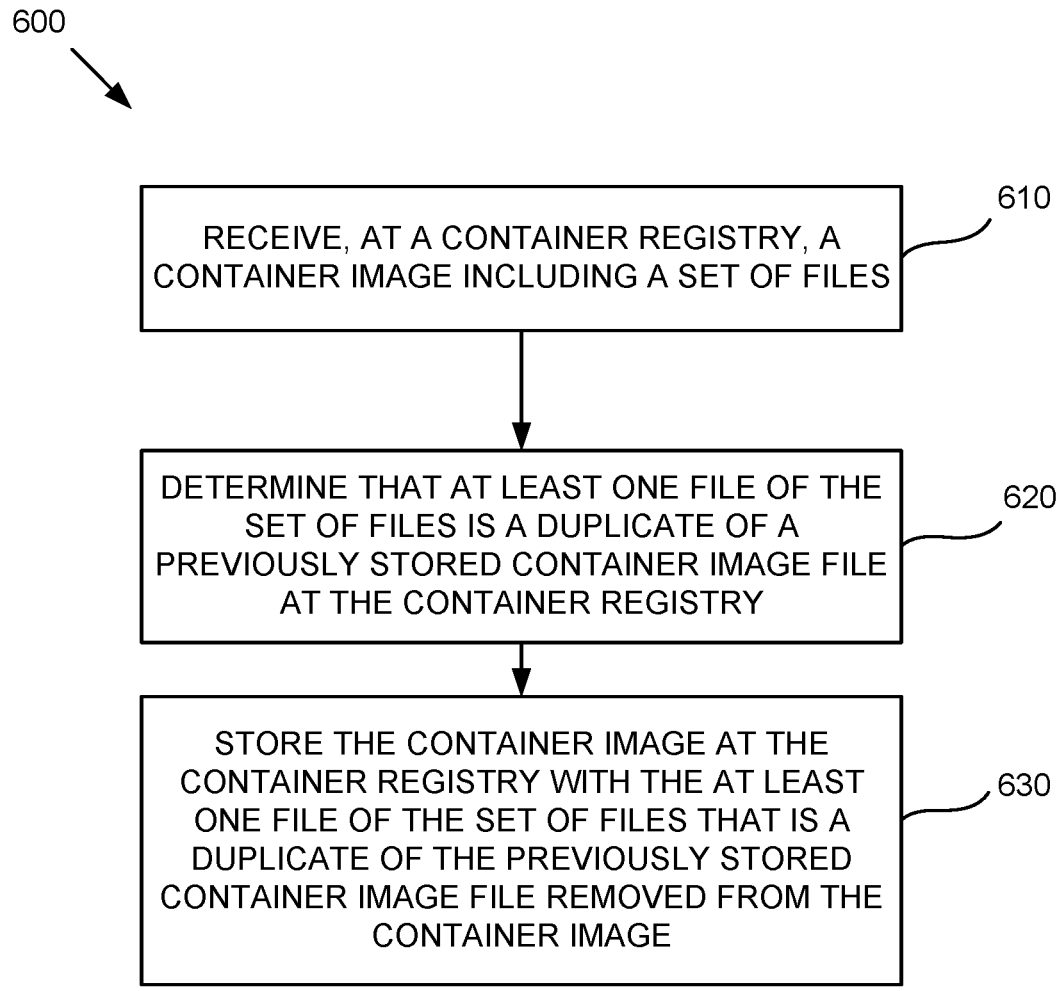
FIG. 6 is a flow diagram of a method of deduplicating a container image pushed to a container registry, in accordance with some embodiments.

FIG. 6 is a flow diagram of a method 600 of deduplicating a container image pushed to a container registry, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by deduplication component 115 of container registry 140 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where processing logic receives, at a container registry, a container image including a set of files. A container image may include one or more packages of compressed files (e.g., tarballs). Each package of files may describe a layer of the container image. In some examples, the files may be compressed individually in a format allowing for search and retrieval of individual files in a package. The container image, and in some examples each package of the container image, may include metadata that describes which files are included in the container image, or package. The metadata may include identifying information about each file and a location (e.g., an offset and size) of the file.

At block 620, the processing logic determines that at least one file of the set of files is a duplicate of a previously stored container image file at the container registry. For example, the processing logic may search the container registry for files matching the files included in the container image. In one example, the processing logic determines a checksum of each of the files in the container image and compares the checksums and determines if any of the files present at the container registry have the same checksum. In some examples, the container registry may index files using a checksum of the file. Therefore, the processing logic may compare the checksums of the container image files to the checksums used to index the files stored at the container registry to determine if there is a match.

At block 630, the processing logic stores the container image at the container registry with the at least one file of the set of files that is a duplicate of the previously stored container image file removed from the container image. For example, the processing logic may remove the files of the container image that are already present at the container registry and update the metadata of the container image to reference the previously stored file (e.g., using the checksum of the file) at the offset of the container image, or package of the container image, corresponding to the removed file. In some examples, the processing logic may generate a new container image without the files already present at the registry and with metadata referencing the already present file. Therefore, duplicate files are not stored at the container registry. Rather, files already stored at the registry can be used to rebuild the container image using the references included in the metadata.

Figure 7:
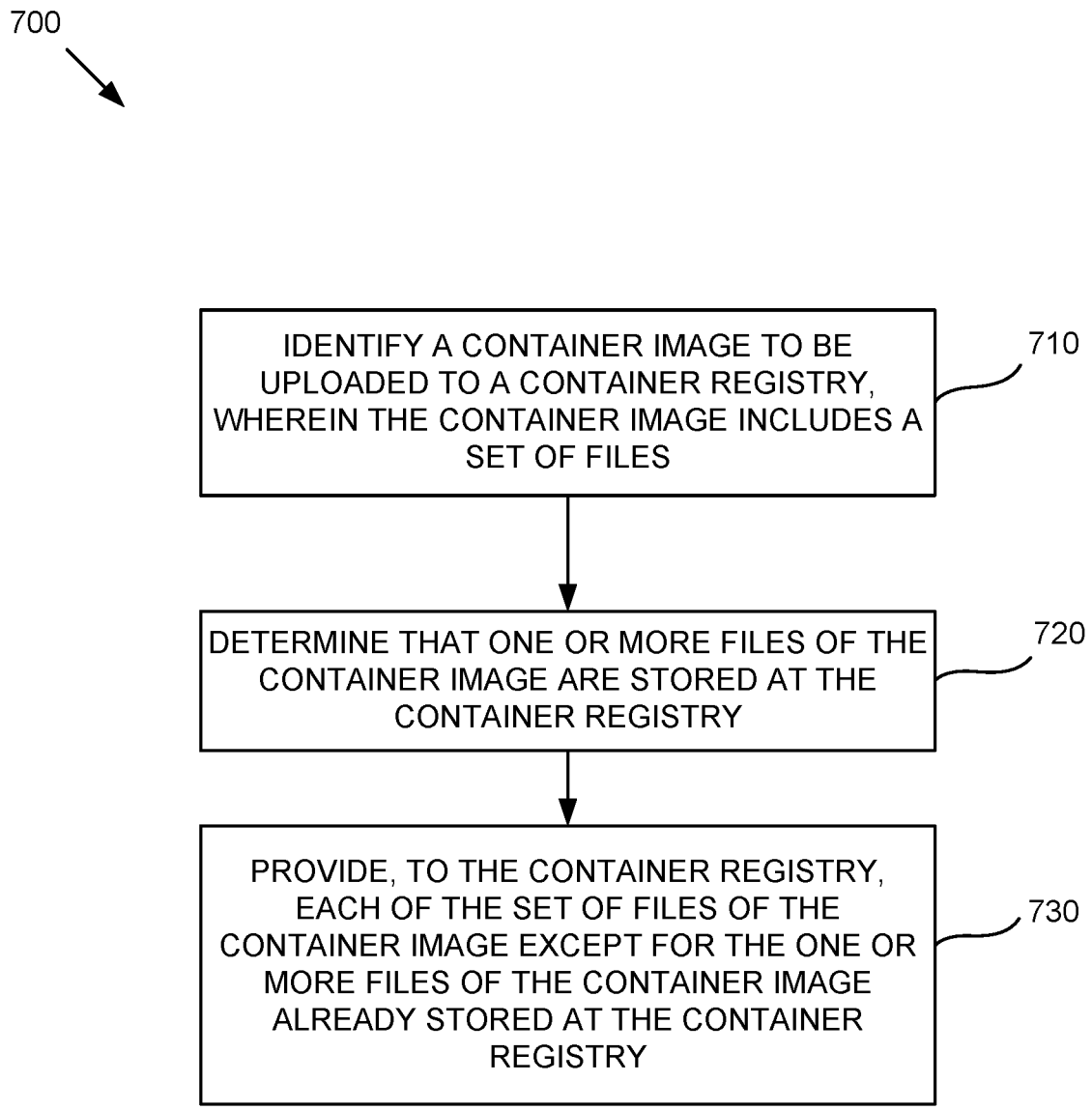
FIG. 7 is a flow diagram of a method of deduplicating files of container image to be uploaded to a container registry, in accordance with some embodiments.

FIG. 7 is a flow diagram of a method 700 of deduplicating files of container image to be uploaded to a container registry, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by deduplication component 115 of container registry 140 of FIG. 1 or deduplication component 115 of client device 330 of FIG. 3.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic identifies a container image to be uploaded to a container registry, wherein the container image includes a set of files. In some examples, the set of files may be compressed (e.g., as one or more tarballs). Each individual file may be searchable and retrievable from the container image using an offset and size of the file. The container registry may store one or more container images that can be retrieved and instantiated by a client device.

At block 720, the processing logic determines that one or more files of the container image are stored at the container registry. In some examples, the processing logic (e.g., a client device) may send a request to the container image with a list of files included in the container image to determine which of the files are already presently stored at the container registry. The list of files may include a checksum, or other index or identifier, of each of the files in the container image. The container registry may compare the checksum or index to the files already present at the container registry to determine if any of the files in the list are stored there. The container registry may then return a second list to the client device identifying each of the files in the first list that are present at the container registry. For example, the second list may be the first list with boolean indicators of whether each of the files in the list are present at the registry.

At block 730, the processing logic provides, to the container registry, each of the set of files of the container image except for the one or more files of the container image already stored at the container registry. The processing logic may use the second list received from the container registry to identify and remove the one or more files from the container image that are present at the container registry. In some examples, the processing logic may update the container image and metadata. In some examples, the processing logic may generate a new container image without the one or more files. The processing logic may also update or generate metadata for the container image to reference the one or more files present at the container registry (e.g., using the checksum of the file). For example, files stored at the container image may be indexed by checksum and therefore the metadata may identify and retrieve the one or more files using the checksum as a reference. Additionally, the metadata may indicate the offset and size (e.g., beginning of file and end of file) of each of the one or more files within the container image such that the file can be retrieved and the original container image may be rebuilt. The processing logic may then provide the new container, without the one or more files, to be stored at the container registry.

Figure 8:
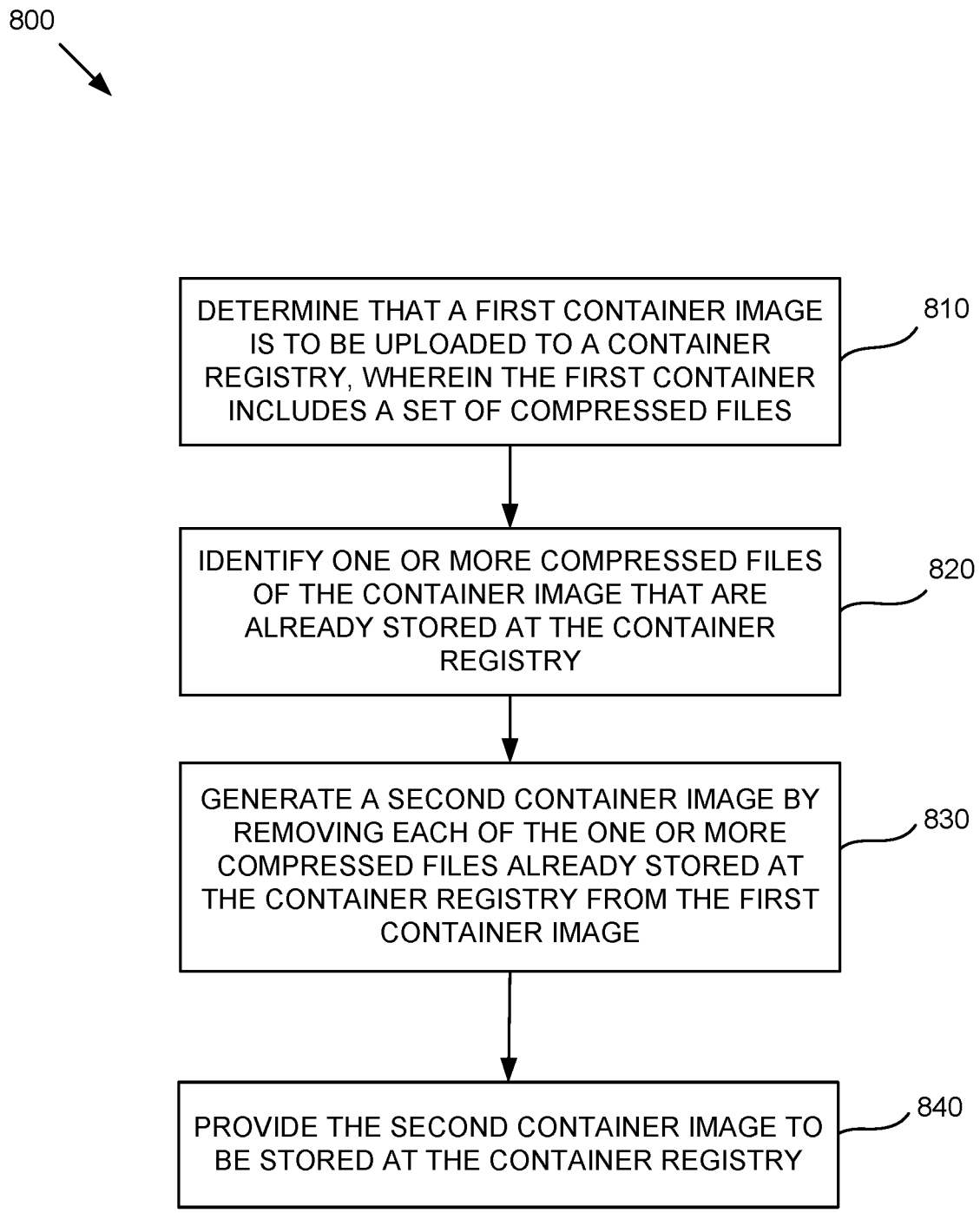
FIG. 8 is a flow diagram of another method of deduplicating files of container image to be uploaded to a container registry, in accordance with some embodiments.

FIG. 8 is a flow diagram of a method 800 of deduplicating files of container image to be uploaded to a container registry, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by deduplication component 115 of container registry 140 of FIG. 1 or deduplication component 115 of client device 330 of FIG. 3.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic determines that a first container image is to be uploaded to a container registry, wherein the first container includes a set of compressed files. For example, the processing logic may compress each of the files individually and append them together into a format that allows each file to be searched and retrieved. In some examples, a client device may initiate a push of the first container image to the container registry.

At block 820, the processing logic identifies one or more compressed files of the container image that are already stored at the container registry. For example, prior to pushing the first container image to the container registry, a deduplication component of a client device may determine if any of the files of the container image are already present at the container registry. The deduplication component may send a list of files to the container registry and the container registry may determine if the files are present at the registry, as described herein. The deduplication component may then receive a new list, or any other data structure, from the registry indicating which of the files were found to be present at the registry.

At block 830, the processing logic generates a second container image by removing each of the one or more compressed files already stored at the container registry from the first container image. For example, the processing logic may append the remaining files together without the removed files. The processing logic may further generate or update metadata for the container image to point to the files already present on the registry at the offset of the container image corresponding to the removed files. Thus, the metadata can be used to retrieve the files already stored at the registry to be inserted into the offset of the removed files.

At block 840, the processing logic provides the second container image to be stored at the container registry. Once the processing logic has deduplicated the files of the container image, the client device may push the second container image to the container registry. Therefore, only the files not present at the registry are pushed, reducing the amount of data that is pushed, the amount of time take to perform the push, and the amount of computing resources needed to perform the push.

Figure 9:
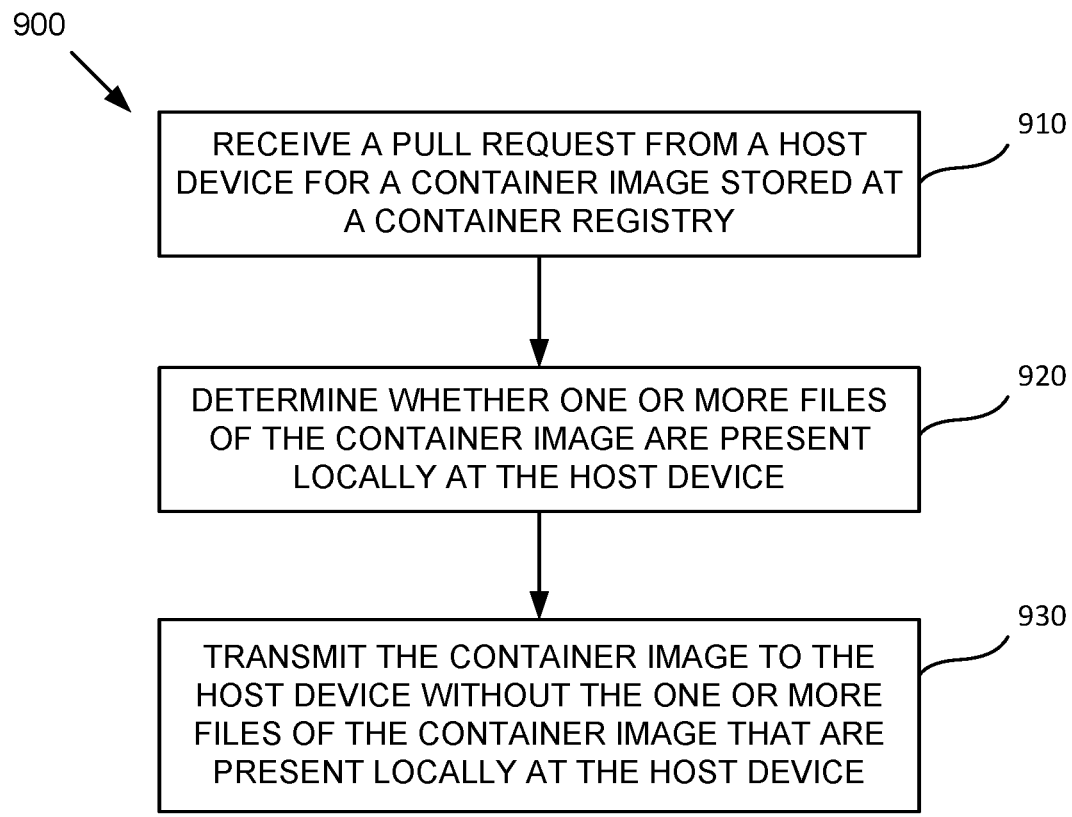
FIG. 9 is a flow diagram of a method of deduplicating files of container image to be pulled from a container registry, in accordance with some embodiments.

FIG. 9 is a flow diagram of a method 900 of deduplicating files of container image to be pulled from a container registry, in accordance with some embodiments. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 900 may be performed by deduplication component 115 of container registry 140 of FIG. 1 or deduplication component 115 of client device 530 of FIG. 5.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic receives a pull request from a host device for a container image stored at a container registry. The host device may be a physical device, virtual machine, or other processing device. The container image may include a set of compressed files appended together. Each file may be individually retrievable.

At block 920, the processing logic determines that one or more files of the container image are present locally at the host device. For example, the processing logic (e.g., the container registry) may provide a list of files in the container image to the host device. The host device may compare the list of files to files stored locally at the host device. For example, the host device may compare a checksum or other index of the files of the container image to local files of the host device. The host device may then provide an indication (e.g., a list or other data structure) of each of the files of the container image present at the host device.

At block 930, the processing logic transmits the container image to the host device without the one or more files of the container image that are present locally at the host device. The processing logic (e.g., the container registry) may use the indication of the files present at the host device to remove the files from the container image prior to providing the container image to the host device. In some examples, the host device may then rebuild the container image using the container image files from the registry and the files stored locally at the host device, as described herein.

Figure 10:
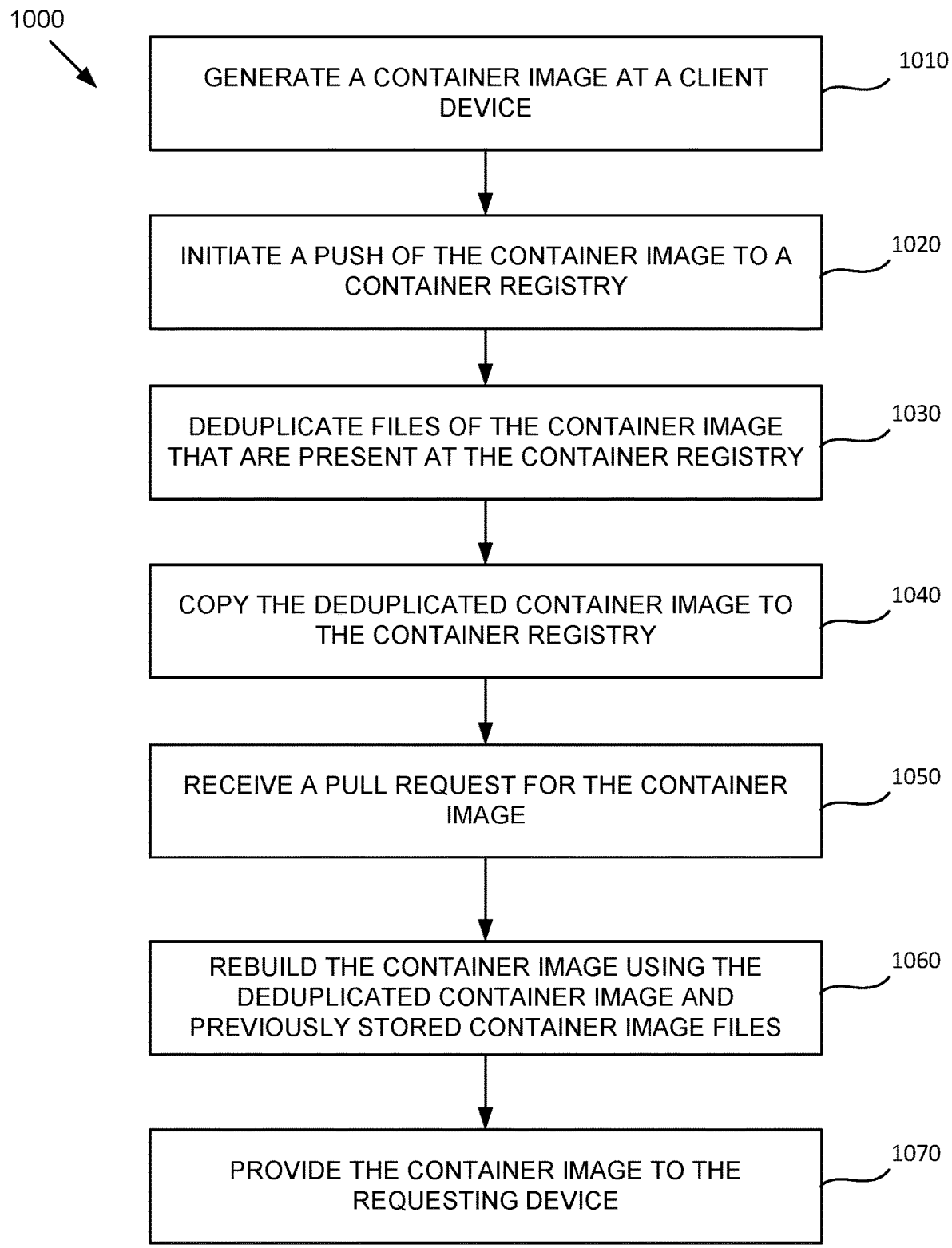
FIG. 10 is a flow diagram of a method of deduplicating files of container image, in accordance with some embodiments.

FIG. 10 is a flow diagram of a method 1000 of deduplicating files of container image, in accordance with some embodiments. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1000 may be performed by deduplication component 115 of FIG. 1.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

Method 1000 begins at block 1010, where the processing logic generates a container image at client device. For example, a user may generate a container image in a workspace of the client device. The container image may be designed for a particular use determined by the user. The container image may be generated from a template, or standard set of files, which can then be customized by the user for a particular use. Therefore, many files of container images generated by users can be duplicates (e.g., the same data in the files). At block 1020, the processing logic (e.g., client device) initiates a push of a container image to a container registry. Once the container image is generated, the user may push the container image to a container registry from which the user can later pull the image to instantiate a container using the container image. At block 1030, the processing logic deduplicates files of the container image that are present at the container registry. As discussed above, because several files of container images may be duplicates, the processing logic may identify which files of the container image are already stored at the registry (e.g., files of previously pushed container images already stored at the registry). The processing logic may then remove the duplicate files from the container image to be pushed so that the files are not duplicated at the registry. The processing logic may update or generate metadata for the container image to reference the files already present at the registry corresponding to the removed files. For example, a checksum may be used to reference the file at the registry, which may be the same checksum as the file removed from the container image. At block 1040, the processing logic copies the deduplicated container image to the container registry. In some examples, the processing logic copies the container image to the registry prior to deduplicating the container image. In some examples, the processing logic copies the image after it has been deduplicated.

At block 1050, processing logic (e.g., container registry) receives a pull request for the container image. For example, a user may select the container image to be instantiated locally at a host device. The processing logic may then identify the container image at the registry that has been requested and retrieve the stored container image (e.g., as deduplicated).

At block 1060, the processing logic rebuilds the container image using the deduplicated container image and previously stored container image files. The processing logic my identify the metadata associated with the container image. The processing logic may then retrieve the previously stored file referenced by the metadata and insert that file into the container image at an offset (e.g., an offset of a particular tarball package) indicated by the metadata. Thus, the processing logic may rebuild the original container image. The processing logic may rebuild the container image at the registry or at the requesting host device. At block 1070, the processing logic provides the container image to the requesting device. In some examples, the processing logic may perform additional deduplication of the pulled container image based on files that are already locally stored at the host device. For example, the processing logic may only pull the container image files from the registry that are not already stored locally at the host device.

Figure 11:
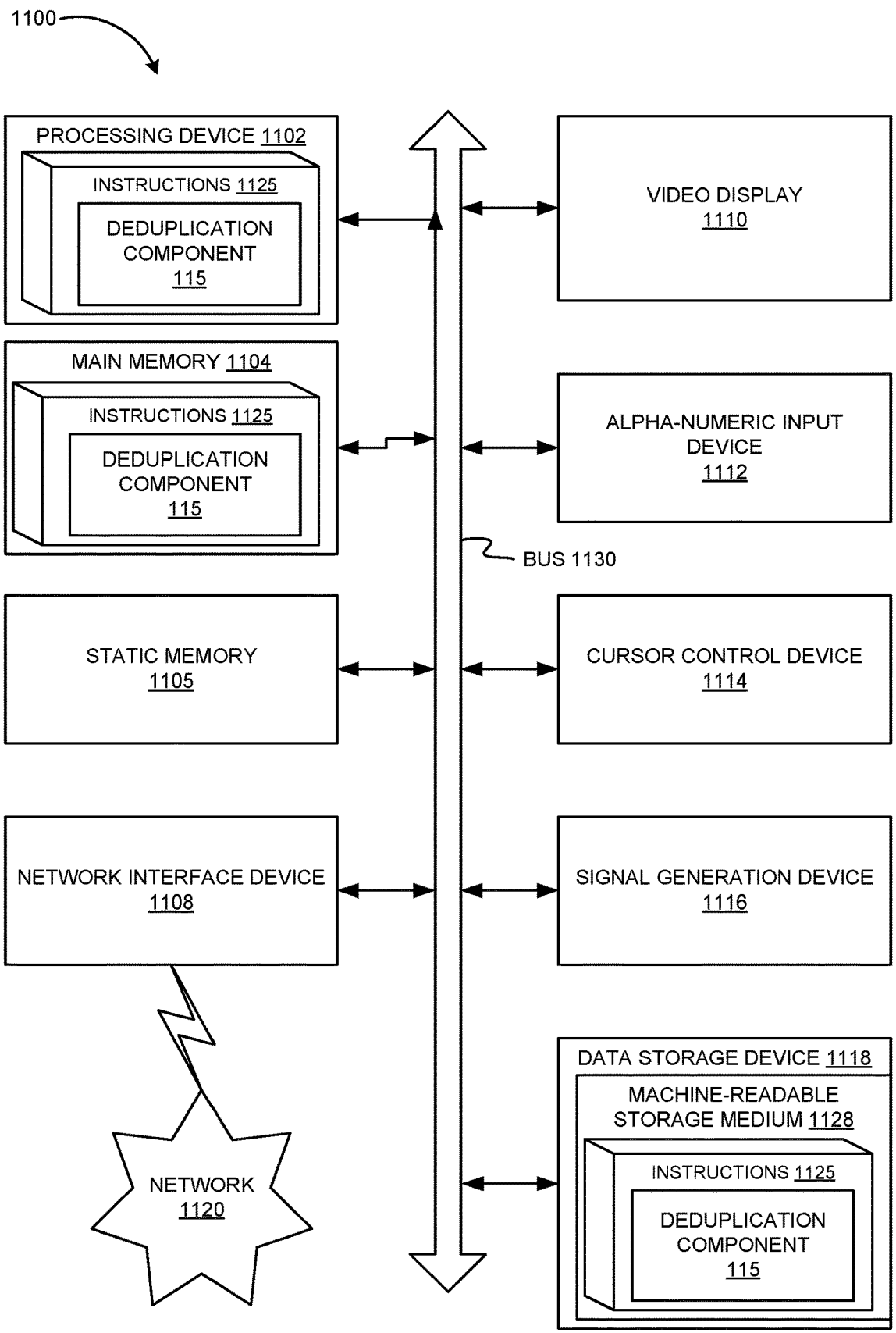
FIG. 11 is a block diagram of an example apparatus that may perform one or more of the operations described herein, in accordance with some embodiments of the present disclosure.

FIG. 11 is a block diagram of an example computing device 1100 that may perform one or more of the operations described herein, in accordance with some embodiments. Computing device 1100 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1100 may include a processing device (e.g., a general purpose processor, a PLD, etc.) 1102, a main memory 1104 (e.g., synchronous dynamic random access memory (DRAM), read-only memory (ROM)), a static memory 1106 (e.g., flash memory and a data storage device 1118), which may communicate with each other via a bus 1130.

Processing device 1102 may be provided by one or more general-purpose processing devices such as a microprocessor, central processing unit, or the like. In an illustrative example, processing device 1102 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1102 may also comprise one or more special-purpose processing devices such as an application specific integrated circuit (ASIC), a field programmable gate array (FPGA), a digital signal processor (DSP), network processor, or the like. The processing device 1102 may be configured to execute the operations described herein, in accordance with one or more aspects of the present disclosure, for performing the operations and steps discussed herein.

Computing device 1100 may further include a network interface device 1108 which may communicate with a network 1120. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse) and an acoustic signal generation device 1116 (e.g., a speaker). In one embodiment, video display unit 1110, alphanumeric input device 1112, and cursor control device 1114 may be combined into a single component or device (e.g., an LCD touch screen).

Data storage device 1118 may include a computer-readable storage medium 1128 on which may be stored one or more sets of instructions 1125 that may include instructions for an anonymization service, e.g., anonymization service 115 for carrying out the operations described herein, in accordance with one or more aspects of the present disclosure. Instructions 1125 may also reside, completely or at least partially, within main memory 1104 and/or within processing device 1102 during execution thereof by computing device 1100, main memory 1104 and processing device 1102 also constituting computer-readable media. The instructions 1125 may further be transmitted or received over a network 1120 via network interface device 1108.

While computer-readable storage medium 1128 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising receiving, at a container registry, a container image comprising a plurality of files; determining, by a processing device, that at least one file of the plurality of files is a duplicate of a previously stored container image file at the container registry; and storing, by the processing device, the container image at the container registry with the at least one file of the plurality of files that is the duplicate of the previously stored container image file removed from the container image.

Example 2 is the method of Example 1, further comprising adding a reference in metadata of the container image to the previously stored duplicate container image file in place of the at least one file of the plurality of files not stored with the container image at the container registry.

Example 3 is the method of Example 1 or Example 2, wherein the reference to the previously stored container image file comprises a checksum of the previously stored container image file.

Example 4 is the method of Example 1, Example 2, or Example 3, wherein determining that at least one file of the plurality of files is a duplicate of a previously stored container image file comprises determining if a checksum of one or more previously stored container image files at the container registry matches a checksum of one of the plurality of files of the container image.

Example 5 is the method of Example 1, Example 2, Example 3, or Example 4, further comprising receiving, from a client device, a pull request for the container image; and retrieving the previously stored container image file to rebuild the container image to include each of the plurality of files of the container image.

Example 6 is the method of Example 1, Example 2, Example 3, Example 4, or Example 5, wherein each of the plurality of files are in a searchable compressed format.

Example 7 is the method of Example 1, Example 2, Example 3, Example 4, Example 5, or Example 6, wherein storing the container image at the container registry with the at least one file removed from the container image comprises removing the at least one file of the plurality of files from the container image; and updating metadata of the container image indicating an offset of the removed file and a reference to the previously stored container image file.

Example 8 a system including a memory and a processing device, operatively coupled to the memory, to receive a compressed container image to be stored at a container registry; identify one or more files of the container image that have matching files already stored at the container registry; remove the one or more files from the compressed container image, and store the container image at the container registry.

Example 9 is the system of Example 8, wherein the compressed container image comprises a plurality of compressed files.

Example 10 is the system of Example 8, or Example 9, wherein each of the plurality of compressed files is searchable.

Example 11 is the system of Example 8, Example 9, or Example 10, wherein to identify the one or more files of the container image that have matching files already stored at the container registry, the processing device is to compare a checksum of each of the plurality of compressed files of the container image to a checksum of each of a plurality of previously stored container image files at the container registry.

Example 12 is the system of Example 8, Example 9, Example 10, or Example 11, wherein the processing device is further to generate a metadata file comprising a reference to each of the matching files already stored at the container registry.

Example 13 is the system of Example 8, Example 9, Example 10, Example 11, or Example 12, wherein the processing device is further to in response to receiving a pull request for the compressed container image, retrieve the second container image and the matching files already stored at the container registry.

Example 14 is the system of Example 8, Example 9, Example 10, Example 11, Example 12, or Example 13, wherein the processing device is further to rebuild the first container image from the second container image and the matching files already stored at the container registry.

Example 15 is a non-transitory computer-readable storage medium including instructions that, when executed by a processing device, cause the processing device to identify a container image to be uploaded to a container registry, wherein the container image comprises a plurality of files, determine, by the processing device that one or more files of the container image are stored at the container registry, and provide, by the processing device, each of the plurality of files of the container image to the container registry except for the one or more files of the container image are already stored at the container registry.

Example 16 is the non-transitory computer-readable storage medium of Example 15, wherein the plurality of files of the container image are individually compressed searchable files.

Example 17 is the non-transitory computer-readable storage medium of Example 15 or Example 16, wherein the processing device is further to update metadata of the container image to include a reference to the one or more container images already stored at the container registry.

Example 18 is the non-transitory computer-readable storage medium of Example 15, Example 16, or Example 17, wherein the processing device is further to provide the metadata of the container image to the container registry along with each of the plurality of files of the container image except for the one or more files of the container image that are already stored at the container registry.

Example 19 is the non-transitory computer-readable storage medium of Example 15, Example 16, Example 17, or Example 18, wherein to determine that one or more files of the container image are stored at the container registry, the processing device is to send a list of checksums for each of the plurality of files of the container image to the container registry; and receive, from the container registry, a second list of files and checksums of the one or more files of the plurality files of the container image that are already stored at the container registry.

Example 20 is the non-transitory computer-readable storage medium of Example 15, Example 16, Example 17, Example 18, or Example 19, wherein the processing device is further to erase each of the one or more files of the container image are already stored at the container registry from the container image prior to providing the container image to the container registry.

Example 21 is the non-transitory computer-readable storage medium of Example 15, Example 16, Example 17, Example 18, Example 19, or Example 20 wherein to update the metadata, the processing device is further to associate the reference to the one or more container images already stored at the container registry with an offset of the one or more files within the container image.

Example 22 is a method comprising determining that a first container image is to be uploaded to a container registry, wherein the first container image comprises a plurality of compressed files; identifying one or more compressed files of the container image are already stored at the container registry; generating a second container image by removing each of the one or more compressed files already stored at the container registry from the first container image; and providing the second container image to be stored at the container registry.

Example 23 is the method of Example 22, further comprising updating metadata of the first container image to include a reference to the one or more compressed files of the first container image already stored at the container registry.

Example 24 is the method of Example 22 or Example 23, wherein the reference to the previously stored container image file comprises a checksum of the previously stored container image file.

Example 25 is the method of Example 22, Example, 23, or Example 24, wherein identifying one or more compressed files of the first container image that are already stored at the container registry comprises sending a list of checksums for each of the plurality of compressed files of the first container image to the container registry; and receiving, from the container registry, a second list of checksums of the one or more files of the plurality of compressed files of the container image that are already stored at the container registry.

Example 26 is the method of Example 22, Example, 23, Example 24, or Example 25, wherein each of the plurality of compressed files of the first container image is searchable.

Example 27 is the method of Example 22, Example, 23, Example 24, Example 25, or Example 26, wherein the metadata of the first container updated to include the reference to the one or more compressed files already stored at the container registry is provided to the container registry with the second container image.

Example 28 is a method comprising receiving a pull request from a host device for a container image stored at a container registry; determining, by a processing device, whether one or more files of the container image are present locally at the host device; and transmitting, by the processing device, the container image to the host device without the one or more files of the container image that are present locally at the host device.

Example 29 is the method of Example 28, further comprising removing the one or more files of the container image that are present locally at the host device from the container image.

Example 30 is the method of Example 28 or Example 29, further comprising updating metadata of the container image to reference the one or more files present locally at the host device at an offset corresponding to the one or more files removed from the container image.

Example 31 is an apparatus comprising means for receiving, at a container registry, a container image comprising a plurality of files; means for determining that at least one file of the plurality of files is a duplicate of a previously stored container image file at the container registry; and means for storing the container image at the container registry without the at least one file of the plurality of files that is a duplicate of the previously stored container image file.

Example 32 is the apparatus of Example 31, further comprising means for adding a reference in metadata of the container image to the previously stored duplicate container image file in place of the at least one file of the plurality of files not stored with the container image at the container registry.

Example 33 is the apparatus of Example 31 or Example 32, wherein the reference to the previously stored container image file comprises a checksum of the previously stored container image file.

Example 34 is the apparatus of Example 31, Example 32, or Example 33, wherein determining that at least one file of the plurality of files is a duplicate of a previously stored container image file comprises means for determining if a checksum of one or more previously stored container image files at the container registry matches a checksum of any of the plurality of files of the container image.

Example 35 is the apparatus of Example 31, Example 32, Example 33, or Example 34, further comprising means for receiving, from a client device, a pull request for the container image; and means for retrieving the previously stored container image file to rebuild the container image to include each of the plurality of files of the container image.

Example 36 is the apparatus of Example 31, Example 32, Example 33, Example 34, or Example 35, wherein each of the plurality of files are in a searchable compressed format.

Example 37 is the apparatus of Example 28, Example 29, Example 30, Example 31, Example 32, or Example 33, wherein storing the container image at the container registry without the at least one file comprises means for removing the at least one file of the plurality of files from the container image; and means for updating metadata of the container image indicating an offset of the removed file and a reference to the previously stored container image file.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, at a container registry, a request from a client device to store a container image comprising a plurality of files, wherein the plurality of files are in an individually compressed and searchable format;
   receiving a first list of files comprising an identifier of each of the plurality of files of the container image in the individually compressed and searchable format;
   determining, by a processing device, that at least one file of the plurality of files is a duplicate of a previously stored container image file at the container registry by comparing the identifier of each of the plurality of files of the container image in the individually compressed and searchable format in the first list to a plurality of previously stored container image files, wherein each previously stored container image file is stored in the individually compressed and searchable format;
   providing, to the client device, a second list of files comprising a reference to the previously stored container image file that is a duplicate of the at least one file of the plurality of files of the container image;
   receiving, from the client device, the container image with the at least one duplicate file removed from the container image, wherein the container image comprises the plurality of files in the individually compressed and searchable format, and wherein the plurality of files are appended together in the individually compressed and searchable format, wherein the at least one file of the plurality of files that is the duplicate of the previously stored container image file is replaced, by the client device, with the reference to the previously stored container image file at the container registry prior to transmitting the container image to the container registry; and
   storing, by the processing device, the container image at the container registry with the at least one file of the plurality of files that is the duplicate of the previously stored container image file removed from the container image, wherein the plurality of files of the container image are stored in the individually compressed format.

2. The method of claim 1, further comprising:
   receiving, from a client device, a pull request for the container image;
   retrieving the previously stored container image file; and
   rebuilding the container image to include each of the plurality of files of the container image in view of the previously stored container image file.

3. The method of claim 1, further comprising:
   adding the reference in metadata of the container image to the previously stored container image file in place of the at least one file of the plurality of files not stored with the container image at the container registry.

4. The method of claim 3, wherein the reference to the previously stored container image file comprises a checksum of the previously stored container image file.

5. The method of claim 1, wherein determining that at least one file of the plurality of files is a duplicate of a previously stored container image file comprises:
   determining if a checksum of one or more previously stored container image files at the container registry matches a checksum of one of the plurality of files of the container image.

6. The method of claim 1, wherein each file of the plurality of files is in a searchable compressed format.

7. The method of claim 1, wherein storing the container image at the container registry with the at least one file removed from the container image comprises:
   removing the at least one file of the plurality of files from the container image; and
   updating metadata of the container image indicating an offset of the file removed from the container image and a reference to the previously stored container image file.

8. A system comprising:
   a memory; and
   a processing device, operatively coupled to the memory, to:
      receive, at a container registry, a request from a client device to store a container image comprising a plurality of files, wherein the plurality of files are in an individually compressed and searchable format;
      receive a first list of files comprising an identifier of each of the plurality of files of the container image in the individually compressed and searchable format;
      determine that at least one file of the plurality of files is a duplicate of a previously stored container image file at the container registry by comparing the identifier of each of the plurality of files of the container image in the individually compressed and searchable format in the first list to a plurality of previously stored container image files, wherein each previously stored container image file is stored in the individually compressed and searchable format;
      provide, to the client device, a second list of files comprising a reference to the previously stored container image file that is a duplicate of the at least one file of the plurality of files of the container image;
      receive, from the client device, the container image with the at least one duplicate file removed from the container image, wherein the container image comprises the plurality of files in the individually compressed and searchable format, and wherein the plurality of files are appended together in the individually compressed and searchable format, wherein the at least one file of the plurality of files that is the duplicate of the previously stored container image file is replaced, by the client device, with the reference to the previously stored container image file at the container registry prior to transmitting the container image to the container registry; and
      store the container image at the container registry with the at least one file of the plurality of files that is the duplicate of the previously stored container image file removed from the container image, wherein the plurality of files of the container image are stored in the individually compressed format.

9. The system of claim 8, wherein the processing device is further to:
   receive, from a client device, a pull request for the container image;
   retrieve the previously stored container image file; and rebuild the container image to include each of the plurality of files of the container image in view of the previously stored container image file.

10. The system of claim 8, wherein the processing device is further to:
add the reference in metadata of the container image to the previously stored container image file in place of the at least one file of the plurality of files not stored with the container image at the container registry.

11. The system of claim 10, wherein the reference to the previously stored container image file comprises a checksum of the previously stored container image file.

12. The system of claim 8, wherein to determine that at least one file of the plurality of files is a duplicate of a previously stored container image file, the processing device is to:
determine if a checksum of one or more previously stored container image files at the container registry matches a checksum of one of the plurality of files of the container image.

13. The system of claim 8, wherein each file of the plurality of files is in a searchable compressed format.

14. The system of claim 13, wherein to store the container image at the container registry with the at least one file removed from the container image, the processing device is to:
remove the at least one file of the plurality of files from the container image; and
update metadata of the container image indicating an offset of the file removed from the container image and a reference to the previously stored container image file.

15. A non-transitory computer readable storage medium including instructions stored therein, that when executed by a processing device, cause the processing device to:
receive, at a container registry, a request from a client device to store a container image comprising a plurality of files, wherein the plurality of files are in an individually compressed and searchable format;
receive a first list of files comprising an identifier of each of the plurality of files of the container image in the individually compressed and searchable format
determine, by the processing device, that at least one file of the plurality of files is a duplicate of a previously stored container image file at the container registry by comparing the identifier of each of the plurality of files of the container image in the individually compressed and searchable format in the first list to a plurality of previously stored container image files, wherein each previously stored container image file is stored in in the individually compressed and searchable format;
provide, to the client device, a second list of files comprising a reference to the previously stored container image file that is a duplicate of the at least one file of the plurality of files of the container image;
receive, from the client device, the container image with the at least one duplicate file removed from the container image, wherein the container image comprises the plurality of files in the individually compressed and searchable format, and wherein the plurality of files are appended together in the individually compressed and searchable format, wherein the at least one file of the plurality of files that is the duplicate of the previously stored container image file is replaced, by the client device, with the reference to the previously stored container image file at the container registry prior to transmitting the container image to the container registry; and
store, by the processing device, the container image at the container registry with the at least one file of the plurality of files that is the duplicate of the previously stored container image file removed from the container image, wherein the plurality of files of the container image are stored in the individually compressed format.

16. The non-transitory computer readable storage medium of claim 15, wherein the processing device is further to:
receive, from a client device, a pull request for the container image;
retrieve the previously stored container image file; and
rebuild the container image to include each of the plurality of files of the container image in view of the previously stored container image file.

17. The non-transitory computer readable storage medium of claim 15, wherein the processing device is further to:
add the reference in metadata of the container image to the previously stored container image file in place of the at least one file of the plurality of files not stored with the container image at the container registry.

18. The non-transitory computer readable storage medium of claim 17, wherein the reference to the previously stored container image file comprises a checksum of the previously stored container image file.

19. The non-transitory computer readable storage medium of claim 15, wherein to determine that at least one file of the plurality of files is a duplicate of a previously stored container image file, the processing device is to:
determine if a checksum of one or more previously stored container image files at the container registry matches a checksum of one of the plurality of files of the container image.

20. The non-transitory computer readable storage medium of claim 19, wherein each file of the plurality of files is in a searchable compressed format.

* * * * *